US012351781B2

(12) United States Patent
Escoffier et al.

(10) Patent No.: US 12,351,781 B2
(45) Date of Patent: Jul. 8, 2025

(54) AQUEOUS LIQUID LAUNDRY FORMULATION

(71) Applicants: Dow Global Technologies LLC, Midland, MI (US); Rohm and Haas Company, Collegeville, PA (US)

(72) Inventors: Anne Oberlin Escoffier, Fontaines Saint Martin (FR); Afua Sarpong Karikari, Bristol, PA (US); Robert Butterick, Swedesboro, NJ (US); Jordan Sarica, Nice (FR)

(73) Assignees: Dow Global Technologies LLC, Midland, MI (US); Rohm and Haas Company, Collegeville, PA (US)

(*) Notice: Subject to any disclaimer, the term of this patent is extended or adjusted under 35 U.S.C. 154(b) by 355 days.

(21) Appl. No.: 17/922,438

(22) PCT Filed: May 27, 2021

(86) PCT No.: PCT/US2021/034383
§ 371 (c)(1),
(2) Date: Oct. 31, 2022

(87) PCT Pub. No.: WO2021/247339
PCT Pub. Date: Oct. 9, 2021

(65) Prior Publication Data
US 2023/0265357 A1 Aug. 24, 2023

Related U.S. Application Data

(60) Provisional application No. 63/033,473, filed on Jun. 2, 2020.

(51) Int. Cl.

| | |
|---|---|
| ***C11D 3/37*** | (2006.01) |
| ***C11D 1/83*** | (2006.01) |
| ***C11D 3/386*** | (2006.01) |
| ***C11D 3/43*** | (2006.01) |
| ***D06L 1/04*** | (2006.01) |
| *C11D 1/22* | (2006.01) |
| *C11D 1/74* | (2006.01) |

(52) U.S. Cl.
CPC .............. *C11D 3/3765* (2013.01); *C11D 1/83* (2013.01); *C11D 3/38645* (2013.01); *C11D 3/43* (2013.01); *C11D 1/22* (2013.01); *C11D 1/74* (2013.01); *C11D 2111/12* (2024.01)

(58) Field of Classification Search
CPC ..... C11D 3/3765; C11D 1/83; C11D 3/38645; C11D 3/43; C11D 2111/12; C11D 1/22; C11D 1/74
See application file for complete search history.

(56) References Cited

U.S. PATENT DOCUMENTS

| | | | |
|---|---|---|---|
| 4,318,818 | A | 3/1982 | Letton et al. |
| 5,780,283 | A | 7/1998 | Lee |
| 8,110,539 | B2 | 2/2012 | Lenoir |
| 8,524,649 | B2 | 9/2013 | Leyrer et al. |
| 2004/0092425 | A1 | 5/2004 | Boutique et al. |
| 2009/0140481 | A1 | 6/2009 | Livingston, Jr. et al. |
| 2015/0337241 | A1 | 11/2015 | Jarvis et al. |

FOREIGN PATENT DOCUMENTS

| | | | |
|---|---|---|---|
| JP | H09250079 | A * | 9/1997 |
| WO | 9535363 | A1 | 12/1995 |
| WO | 2007120547 | | 10/2007 |
| WO | 2009140481 | A1 | 11/2009 |
| WO | 2016001319 | A1 | 1/2016 |
| WO | 2016049395 | A1 | 3/2016 |
| WO | 2017089164 | A1 | 6/2017 |

OTHER PUBLICATIONS

Search Report from corresponding Chinese Application No. 202180039158.8 dated Oct. 18, 2023.

* cited by examiner

*Primary Examiner* — Lorna M Douyon
*Assistant Examiner* — Brittany Sharon Harris
(74) *Attorney, Agent, or Firm* — Thomas S. Deibert

(57) ABSTRACT

An aqueous liquid laundry formulation is provided, comprising: a liquid carrier; a cellulase; and a protectant polymer, wherein the protectant polymer comprises: 25 to 65 wt %, based on weight of the protectant polymer, of structural units of formula I

I

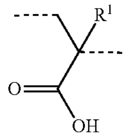

wherein each $R^1$ is independently selected from a hydrogen and a $-CH_3$ group; and 35 to 75 wt %, based on weight of the protectant polymer, of structural units of formula II

II

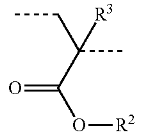

wherein each $R^2$ is independently selected from a $-C_{2-3}$ alkyl group and wherein each $R^3$ is independently selected from a hydrogen and a methyl group. Also provided is a (Continued)

method of renewing a soiled cotton containing fabric using aqueous liquid laundry formulation.

8 Claims, No Drawings

AQUEOUS LIQUID LAUNDRY FORMULATION

The present invention relates to an aqueous liquid laundry formulation. In particular, the present invention relates to an aqueous liquid laundry formulation, comprising a liquid carrier; a cellulase; and a protectant polymer, wherein the protectant polymer comprises: 25 to 65 wt %, based on weight of the protectant polymer, of structural units of formula I

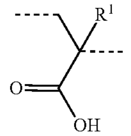

I wherein each $R^1$ is independently selected from a hydrogen and a $-CH_3$ group; and 35 to 75 wt %, based on weight of the protectant polymer, of structural units of formula II

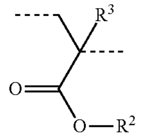

II wherein each $R^2$ is independently selected from a $-C_{2-3}$ alkyl group and wherein each $R^3$ is independently selected from a hydrogen and a methyl group.

Enzymes (e.g., cellulases) are increasingly considered desirable for formulation into cleaning formulations. These cleaning formulations; however, have historically been plagued with issues—e.g., chemical instability resulting in a loss of enzymatic activity. The loss of enzyme activity is more pronounced in liquid and gel compositions. Enzymes may be destabilized in these formulations by unfolding of the three-dimensional structure of the enzyme or by the enzyme breaking down. Common destabilizers include polar solvents like water or other solvents, microbial attack, electrolytes, charged surfactants temperature and extreme pH. This instability becomes even more of an issue upon storage. The loss of enzymatic activity upon storage has resulted in a more limited adoption of the use of certain enzymes in the liquid detergent industry. It is not uncommon for certain products to be stored in warehouses in various climates around the world where a given product may be subjected to a temperature that may range from freezing to above 40° C. for extended periods. Upon storage under such temperature extremes for a period of weeks, many liquid enzymatic compositions lose from 20 to 100 percent of their enzymatic activity resulting from enzyme instability.

In order to compensate for the loss of enzyme activity during periods of storage, formulators may resort to the use of excess enzymes in the formulation. Enzymes are relatively expensive formulation ingredients. Accordingly, formulators have sought to employ enzyme stabilizers in liquid compositions to inhibit the enzyme destabilization reactions.

One approach for stabilizing enzyme containing formulations is described by Lenoir in U.S. Pat. No. 8,110,539. Lenoir discloses a method for stabilizing liquid enzyme containing liquid formulations by adding at least one boron compound and at least one alpha-hydroxy-mono-carboxylic acid or the salt of an alpha-hydroxy-mono-carboxylic acid capable of forming an enzyme-stabilizing compound.

Notwithstanding, there remains a continuing need for aqueous liquid laundry formulations exhibiting enzyme stability upon storage at elevated temperatures for extended periods of time.

The present invention provides an aqueous liquid laundry formulation, comprising: a liquid carrier; a cellulase; and a protectant polymer, wherein the protectant polymer comprises: 25 to 65 wt %, based on weight of the protectant polymer, of structural units of formula I; wherein each $R^1$ is independently selected from a hydrogen and a $-CH_3$ group; and 35 to 75 wt %, based on weight of the protectant polymer, of structural units of formula II; wherein each $R^2$ is independently selected from a $-C_{2-3}$ alkyl group and wherein each $R^3$ is independently selected from a hydrogen and a methyl group.

The present invention provides a method for renewing a soiled cotton containing fabric comprising: providing a soiled cotton containing fabric; providing an aqueous liquid laundry formulation of the present invention; providing a wash water; providing a rinse water; contacting the soiled cotton containing fabric with the aqueous liquid laundry formulation and the wash water to provide a renewed cotton containing fabric; and contacting the renewed cotton containing fabric with the rinse water to rinse off the aqueous liquid laundry formulation.

DETAILED DESCRIPTION

It has been surprisingly found that the aqueous liquid laundry formulations of the present invention containing a protectant polymer and a cellulase exhibit enhanced anti-redeposition performance on cotton containing fabrics following extended storage (i.e., seven weeks) at ≥40° C. (preferably, 40° C.).

Unless otherwise indicated, ratios, percentages, parts, and the like are by weight. Weight percentages (or wt %) in the composition are percentages of dry weight, i.e., excluding any water that may be present in the composition.

As used herein, unless otherwise indicated, the terms "weight average molecular weight" and "$M_w$" are used interchangeably to refer to the weight average molecular weight as measured in a conventional manner with gel permeation chromatography (GPC) and conventional standards, such as polystyrene standards. GPC techniques are discussed in detail in Modern Size Exclusion Liquid Chromatography: Practice of Gel Permeation and Gel Filtration Chromatography, Second Edition, Striegel, et al., John Wiley & Sons, 2009. Weight average molecular weights are reported herein in units of Daltons.

The term "structural units" as used herein and in the appended claims refers to the remnant of the indicated monomer; thus a structural unit of (meth)acrylic acid is illustrated:

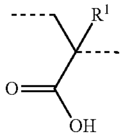

wherein the dotted lines represent the points of attachment to the polymer backbone and where $R^1$ is a hydrogen for structural units of acrylic acid and a —$CH_3$ group for structural units of methacrylic acid.

Preferably, the liquid laundry formulation of the present invention, comprises a liquid carrier (preferably, 25 to 99.949 wt % (more preferably, 30 to 99.89 wt %; still more preferably, 35 to 99.7 wt %; most preferably, 40 to 60 wt %), based on weight of the aqueous liquid laundry formulation, of the liquid carrier); a cellulase (preferably, 0.001 to 2 wt % (more preferably, 0.01 to 1 wt %; still more preferably, 0.05 to 0.5 wt %; most preferably, 0.075 to 0.2 wt %), based on weight of the aqueous liquid laundry formulation, of the cellulase); and a protectant polymer (preferably, 0.05 to 5 wt % (more preferably, 0.1 to 3 wt %; still more preferably, 0.25 to 2.0 wt %; most preferably, 0.4 to 1 wt %), based on weight of the aqueous liquid laundry formulation, of the protectant polymer), wherein the protectant polymer comprises: 25 to 65 wt % (preferably, 30 to 60 wt %; more preferably, 35 to 55 wt %; most preferably, 40 to 44 wt %), based on weight of the protectant polymer, of structural units of formula I

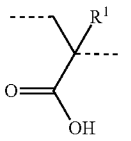

I wherein each $R^1$ is independently selected from a hydrogen and a —$CH_3$ group; and 35 to 75 wt % (preferably, 40 to 70 wt %; more preferably, 45 to 65 wt %; most preferably, 56 to 60 wt %), based on weight of the protectant polymer, of structural units of formula II

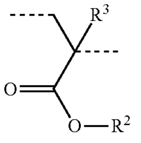

II wherein each $R^2$ is independently selected from a —$C_{2-3}$ alkyl group (preferably, a —$C_2$ alkyl group) and wherein each $R^3$ is independently selected from a hydrogen and a methyl group (preferably, a hydrogen).

Preferably, the aqueous liquid laundry formulation of the present invention, comprises a liquid carrier. More preferably, the aqueous liquid laundry formulation of the present invention comprises 25 to 99.949 wt % (preferably, 30 to 99.89 wt %; more preferably, 35 to 99.7 wt %; most preferably, 40 to 60 wt %), based on weight of the aqueous liquid laundry formulation, of a liquid carrier. Still more preferably, the aqueous liquid laundry formulation of the present invention comprises 25 to 99.949 wt % (preferably, 30 to 99.89 wt %; more preferably, 35 to 99.7 wt %; most preferably, 40 to 60 wt %), based on weight of the aqueous liquid laundry formulation, of a liquid carrier; wherein the liquid carrier comprises water. Most preferably, the aqueous liquid laundry formulation of the present invention comprises 25 to 99.949 wt % (preferably, 30 to 99.89 wt %; more preferably, 35 to 99.7 wt %; most preferably, 40 to 60 wt %), based on weight of the aqueous liquid laundry formulation, of a liquid carrier; wherein the liquid carrier is water.

Preferably, the liquid carrier optionally includes water miscible liquids, such as, $C_{1-3}$ alkanolamines (e.g., monoethanolamine), $C_{1-3}$ alkanols (e.g., ethanol) and $C_{1-3}$ diols (e.g., propylene glycol). More preferably, the liquid carrier optionally includes 0 to 20 wt % (preferably, 1 to 17.5 wt %; more preferably, 2.5 to 15 wt %; most preferably, 5 to 12 wt %), based on weight of the liquid carrier, of water miscible liquids; wherein the water miscible liquids are selected from the group consisting of $C_{1-3}$ alkanolamines, $C_{1-3}$ alkanols, $C_{1-3}$ diols and mixtures thereof. Most preferably, the liquid carrier optionally includes 0 to 20 wt % (preferably, 1 to 17.5 wt %; more preferably, 2.5 to 15 wt %; most preferably, 5 to 12 wt %), based on weight of the liquid carrier, of water miscible liquids; wherein the water miscible liquids include ethanol, monoethanolamine and propylene glycol.

Preferably, the aqueous liquid laundry formulation of the present invention, comprises a cellulase. More preferably, the aqueous liquid laundry formulation of the present invention comprises 0.001 to 2 wt % (preferably, 0.01 to 1 wt %; more preferably, 0.05 to 0.5 wt %; most preferably, 0.075 to 0.2 wt %), based on weight of the aqueous liquid laundry formulation, of a cellulase. Most preferably, the aqueous liquid laundry formulation of the present invention comprises 0.001 to 2 wt % (preferably, 0.01 to 1 wt %; more preferably, 0.05 to 0.5 wt %; most preferably, 0.075 to 0.2 wt %), based on weight of the aqueous liquid laundry formulation, of a cellulase; wherein the cellulase is of bacterial or fungal origin (preferably, the cellulase may be a chemically or genetically modified mutant). Suitable cellulases may include cellulases derived from the genera of *Bacillus, Pseudomonas, Fusarium, Humicola, Thielavia, Acremonium* and *Myceliophthora*. Preferred cellulases may include cellulases derived from *Humicola insolens, Myceliophthora thermophila* and *Fusarium oxysporum*. Commercially available cellulases include Carezyme™, Celluzyme™, Celluclean™, Celluclast™ Endolase™, Renozyme™, Whitezyme™ (available from Novozymes A/S); Clazinase™ (available from Genencor) and KAC-500 (B)™ (available from Kao Corporation).

Preferably, the aqueous liquid laundry formulation of the present invention, comprises a protectant polymer. More preferably, the aqueous liquid laundry formulation of the present invention comprises 0.05 to 5 wt % (preferably, 0.1 to 3 wt %; more preferably, 0.25 to 2.0 wt %; most preferably, 0.4 to 1 wt %), based on weight of the aqueous liquid laundry formulation, of a protectant polymer. Most preferably, the aqueous liquid laundry formulation of the present invention comprises 0.05 to 5 wt % (preferably, 0.1 to 3 wt %; more preferably, 0.25 to 2.0 wt %; most preferably, 0.4 to 1 wt %), based on weight of the aqueous liquid laundry formulation, of a protectant polymer; wherein the protectant polymer comprises: 25 to 65 wt % (preferably, 30 to 60 wt %; more preferably, 35 to 55 wt %; most preferably, 40 to 44 wt %), based on weight of the protectant polymer, of structural units of formula I; wherein each $R^1$ is independently selected from a hydrogen and a —$CH_3$ group; (preferably, wherein $R^1$ is a hydrogen in 20 to 60 mol % of the structural units of formula I in the protectant polymer; more preferably, wherein $R^1$ is a hydrogen in 30 to 50 mol % of the structural units of formula I in the protectant polymer; still more preferably, wherein $R^1$ is a hydrogen in 35 to 45 mol % of the structural units of formula I in the protectant polymer; most preferably, wherein $R^1$ is a hydrogen in 37.5 to 42.5 mol % of the structural units of formula I in the protectant polymer); and 35 to 75 wt %, based on weight of the protectant polymer, of structural units of formula II; wherein each $R^2$ is independently selected from a —$C_{2-3}$ alkyl group (preferably, a —$C_2$ alkyl group) and wherein each $R^3$ is independently selected from a hydrogen and a methyl group (preferably, a hydrogen).

Preferably, the protectant polymer used in the aqueous liquid laundry formulation of the present invention comprises 25 to 65 wt % (preferably, 30 to 60 wt %; more preferably, 35 to 55 wt %; most preferably, 40 to 44 wt %), based on weight of the protectant polymer, of structural units of formula I; wherein each $R^1$ is independently selected from a hydrogen and a —$CH_3$ group. More preferably, the protectant polymer used in the aqueous liquid laundry formulation of the present invention comprises 25 to 65 wt % (preferably, 30 to 60 wt %; more preferably, 35 to 55 wt %; most preferably, 40 to 44 wt %), based on weight of the protectant polymer, of structural units of formula I; wherein $R^1$ is a hydrogen in 20 to 60 mol % (preferably, 30 to 50 mol %; more preferably, 35 to 45 mol %; most preferably, 37.5 to 42.5 mol %) of the structural units of formula I in the protectant polymer.

Preferably, the protectant polymer used in the aqueous liquid laundry formulation of the present invention comprises 35 to 75 wt % (preferably, 40 to 70 wt %; more preferably, 45 to 65 wt %; most preferably, 56 to 60 wt %), based on weight of the protectant polymer, of structural units of formula II; wherein each $R^2$ is independently selected from a —$C_{2-3}$ alkyl group and wherein each $R^3$ is independently selected from a hydrogen and a methyl group. More preferably, the protectant polymer used in the aqueous liquid laundry formulation of the present invention comprises 35 to 75 wt % (preferably, 40 to 70 wt %; more preferably, 45 to 65 wt %; most preferably, 56 to 60 wt %), based on weight of the protectant polymer, of structural units of formula II; wherein each $R^2$ is independently selected from a —$C_{2-3}$ alkyl group; wherein $R^2$ is an ethyl group in 75 to 100 mol % (preferably, 90 to 100 mol %; more preferably, 98 to 100 mol %; most preferably, 100 mol %) of the structural units of formula II in the protectant polymer; wherein each $R^3$ is independently selected from a hydrogen and a methyl group; and wherein $R^3$ is a hydrogen in 75 to 100 mol % (preferably, 90 to 100 mol %; more preferably, 98 to 100 mol %; most preferably, 100 mol %) of the structural units of formula II in the protectant polymer. Most preferably, the protectant polymer used in the aqueous liquid laundry formulation of the present invention comprises 35 to 75 wt % (preferably, 40 to 70 wt %; more preferably, 45 to 65 wt %; most preferably, 56 to 60 wt %), based on weight of the protectant polymer, of structural units of formula II; wherein $R^2$ is an ethyl group and wherein each $R^3$ is a hydrogen.

Preferably, the protectant polymer used in the aqueous liquid laundry formulation of the present invention has a weight average molecular weight, $M_w$, of 1,200 to 100,000 Daltons. More preferably, the protectant polymer used in the aqueous liquid laundry formulation of the present invention has a weight average molecular weight, $M_w$, of 5,000 to 80,000 Daltons. Still more preferably, the protectant polymer used in the aqueous liquid laundry formulation of the present invention has a weight average molecular weight, $M_w$, of 10,000 to 60,000 Daltons. Most preferably, the protectant polymer used in the aqueous liquid laundry formulation of the present invention has a weight average molecular weight, $M_w$, of 25,000 to 50,000 Daltons.

Preferably, the protectant polymer used in the aqueous liquid laundry formulation of the present invention comprises ≤0.3 wt % (more preferably, ≤0.1 wt %; still more preferably, ≤0.05 wt %; yet still more preferably, ≤0.03 wt %; most preferably, <the detectable limit), based on weight of the protectant polymer, of structural units of multi-ethylenically unsaturated crosslinking monomer.

Preferably, the protectant polymer used in the aqueous liquid laundry formulation of the present invention comprises ≤1 wt % (preferably, ≤0.5 wt %; more preferably, <0.001 wt %; still more preferably, ≤0.0001 wt %; most preferably, <the detectable limit), based on weight of the protectant polymer, of structural units of sulfonated monomer. More preferably, the protectant polymer used in the aqueous liquid laundry formulation of the present invention comprises ≤1 wt % (preferably, ≤0.5 wt %; more preferably, ≤0.001 wt %; still more preferably, ≤0.0001 wt %; most preferably, <the detectable limit), based on weight of the protectant polymer, of structural units of sulfonated monomer selected from the group consisting of 2-acrylamido-2-methylpropane sulfonic acid (AMPS), 2-methacrylamido-2-methylpropane sulfonic acid, 4-styrenesulfonic acid, vinylsulfonic acid, 3-allyloxy sulfonic acid, 2-hydroxy-1-propane sulfonic acid (HAPS), 2-sulfoethyl(meth)acrylic acid, 2-sulfopropyl(meth)acrylic acid, 3-sulfopropyl(meth)acrylic acid, 4-sulfobutyl(meth)acrylic acid and salts thereof. Most preferably, the protectant polymer used in the aqueous liquid laundry formulation of the present invention comprises ≤1 wt % (preferably, ≤0.5 wt %; more preferably, ≤0.001 wt %; still more preferably, ≤0.0001 wt %; most preferably, <the detectable limit), based on weight of the protectant polymer, of structural units of 2-acrylamido-2-methylpropane sulfonic acid (AMPS) monomer.

Methods of making the protectant polymer used in the aqueous liquid laundry formulation of the present invention are well known in the art.

Preferably, the aqueous liquid laundry formulation of the present invention contains <1 wt % (preferably, <0.5 wt %; more preferably, <0.2 wt %; still more preferably, <0.1 wt %; yet still more preferably, <0.01 wt %; most preferably, <the detectable limit), based on the dry weight of the aqueous liquid laundry formulation, of a vinyl alcohol polymer (PVA).

Preferably, the aqueous liquid laundry formulation of the present invention contains <0.1 wt % (preferably, <0.05 wt %; more preferably, <0.02 wt %; still more preferably, <0.01 wt %; yet still more preferably, <0.001 wt %; most preferably, <the detectable limit), based on the dry weight of the aqueous liquid laundry formulation, of a low molecular weight carboxylic acids selected from the group consisting of formates, acetates, propionates and mixtures thereof.

Preferably, the aqueous liquid laundry formulation of the present invention contains <0.1 wt % (preferably, <0.05 wt %; more preferably, <0.02 wt %; still more preferably, <0.01 wt %; yet still more preferably, <0.001 wt %; most preferably, <the detectable limit), based on the dry weight of the aqueous liquid laundry formulation, of boron containing compounds.

Preferably, the aqueous liquid laundry formulation of the present invention contains <0.1 wt % (preferably, <0.05 wt %; more preferably, <0.02 wt %; still more preferably, <0.01 wt %; yet still more preferably, <0.001 wt %; most preferably, <the detectable limit), based on the dry weight of the aqueous liquid laundry formulation, of alph-hydroxy-mono-carboxylic acid or salt of alph-hydroxy-mono-carboxylic acid.

Preferably, the aqueous liquid laundry formulation of the present invention, optionally, further comprises an additional component selected from the group consisting of at least one of a cleaning surfactant, a structurant, a hydrotrope, a fragrance, a foam control agent (e.g., fatty acid, polydimethylsiloxane); a builder and a fabric softener.

Preferably, the aqueous liquid laundry formulation of the present invention, further comprises: a cleaning surfactant. More preferably, the aqueous liquid laundry formulation of the present invention, comprises: 2 to 60 wt % (more preferably, 5 to 50 wt %; still more preferably, 7.5 to 40 wt %; yet more preferably, 10 to 30 wt %; most preferably, 15 to 25 wt %), based on weight of the aqueous liquid laundry formulation, of a cleaning surfactant. Still more preferably, the aqueous liquid laundry formulation of the present invention, comprises: 2 to 60 wt % (more preferably, 5 to 50 wt %; still more preferably, 7.5 to 40 wt %; yet more preferably, 10 to 30 wt %; most preferably, 15 to 25 wt %), based on weight of the aqueous liquid laundry formulation, of a cleaning surfactant; wherein the cleaning surfactant is selected from the group consisting of anionic surfactants, nonionic surfactants, cationic surfactants, amphoteric surfactants and mixtures thereof. Yet still more preferably, the aqueous liquid laundry formulation of the present invention, comprises: 2 to 60 wt % (more preferably, 5 to 50 wt %; still more preferably, 7.5 to 40 wt %; yet more preferably, 10 to 30 wt %; most preferably, 15 to 25 wt %), based on weight of the aqueous liquid laundry formulation, of a cleaning surfactant; wherein the cleaning surfactant is selected from the group consisting of a mixture including an anionic surfactant and a non-ionic surfactant. Most preferably, the aqueous liquid laundry formulation of the present invention, comprises: 2 to 60 wt % (more preferably, 5 to 50 wt %; still more preferably, 7.5 to 40 wt %; yet more preferably, 10 to 30 wt %; most preferably, 15 to 25 wt %), based on weight of the aqueous liquid laundry formulation, of a cleaning surfactant; wherein the cleaning surfactant includes a mixture of a linear alkyl benzene sulfonate, a sodium lauryl ethoxysulfate and a nonionic alcohol ethoxylate.

Anionic surfactants include alkyl sulfates, alkyl benzene sulfates, alkyl benzene sulfonic acids, alkyl benzene sulfonates, alkyl polyethoxy sulfates, alkoxylated alcohols, paraffin sulfonic acids, paraffin sulfonates, olefin sulfonic acids, olefin sulfonates, alpha-sulfocarboxylates, esters of alpha-sulfocarboxylates, alkyl glyceryl ether sulfonic acids, alkyl glyceryl ether sulfonates, sulfates of fatty acids, sulfonates of fatty acids, sulfonates of fatty acid esters, alkyl phenols, alkyl phenol polyethoxy ether sulfates, 2-acryloxy-alkane-1-sulfonic acid, 2-acryloxy-alkane-1-sulfonate, beta-alkyloxy alkane sulfonic acid, beta-alkyloxy alkane sulfonate, amine oxides and mixtures thereof. Preferred anionic surfactants include $C_{8-20}$ alkyl benzene sulfates, $C_{8-20}$ alkyl benzene sulfonic acid, $C_8$-20 alkyl benzene sulfonate, paraffin sulfonic acid, paraffin sulfonate, alpha-olefin sulfonic acid, alpha-olefin sulfonate, alkoxylated alcohols, $C_{8-20}$ alkyl phenols, amine oxides, sulfonates of fatty acids, sulfonates of fatty acid esters, $C_{8-10}$ alkyl polyethoxy sulfates and mixtures thereof. More preferred anionic surfactants include $C_{12-16}$ alkyl benzene sulfonic acid, $C_{12-16}$ alkyl benzene sulfonate, $C_{12-18}$ paraffin-sulfonic acid, $C_{12-18}$ paraffin-sulfonate, $C_{12-16}$ alkyl polyethoxy sulfate and mixtures thereof.

Non-ionic surfactants include alkoxylates, polyglycol ethers, fatty alcohol polyglycol ethers, alkylphenol polyglycol ethers, end group capped polyglycol ethers, mixed ethers, hydroxy mixed ethers, fatty acid polyglycol esters and mixtures thereof. Preferred non-ionic surfactants include alkoxylates. More preferred non-ionic surfactants include ethoxylated and propoxylated alcohols. Most preferred non-ionic surfactants include ethoxylated and propoxylated alcohols derived from bio-renewable seed oil alcohols.

Cationic surfactants include quaternary surface active compounds. Preferred cationic surfactants include quaternary surface active compounds having at least one of an ammonium group, a sulfonium group, a phosphonium group, an iodonium group and an arsonium group. More preferred cationic surfactants include at least one of a dialkyldimethylammonium chloride and alkyl dimethyl benzyl ammonium chloride. Still more preferred cationic surfactants include at least one of $C_{16-18}$ dialkyldimethylammonium chloride, a $C_{8-18}$ alkyl dimethyl benzyl ammonium chloride di-tallow dimethyl ammonium chloride and di-tallow dimethyl ammonium chloride. Most preferred cationic surfactant includes di-tallow dimethyl ammonium chloride.

Amphoteric surfactants include betaines, amine oxides, alkylamidoalkylamines, alkyl-substituted amine oxides, acylated amino acids, derivatives of aliphatic quaternary ammonium compounds and mixtures thereof. Preferred amphoteric surfactants include derivatives of aliphatic quaternary ammonium compounds. More preferred amphoteric surfactants include derivatives of aliphatic quaternary ammonium compounds with a long chain group having 8 to 18 carbon atoms. Still more preferred amphoteric surfactants include at least one of $C_{12-14}$ alkyldimethylamine oxide, 3-(N,N-dimethyl-N-hexadecyl-ammonio)propane-1-sulfonate, 3-(N,N-dimethyl-N-hexadecylammonio)-2-hydroxypropane-1-sulfonate. Most preferred amphoteric surfactants include at least one of $C_{12-14}$ alkyldimethylamine oxide.

Preferably, the aqueous liquid laundry formulation of the present invention, optionally further comprises a structurant. More preferably, the aqueous liquid laundry formulation of the present invention, further comprises 0 to 2 wt % (preferably, 0.05 to 0.8 wt %; more preferably, 0.1 to 0.4 wt %), based on weight of the aqueous liquid laundry formulation, of a structurant. Most preferably, the aqueous liquid laundry formulation of the present invention, further comprises 0 to 2 wt % (preferably, 0.05 to 0.8 wt %; more preferably, 0.1 to 0.4 wt %), based on weight of the aqueous liquid laundry formulation, of a structurant; wherein the structurant is a non-polymeric, crystalline hydroxy-functional materials capable of forming thread like structuring systems throughout the liquid laundry detergent formulation when crystallized in situ. Structurants are useful for providing sufficient yield stress or low shear viscosity to stabilize the aqueous liquid laundry formulation.

Preferably, the aqueous liquid laundry formulation of the present invention, optionally further comprises a hydrotrope. More preferably, the aqueous liquid laundry formulation of the present invention, optionally further comprises: 0 to 10 wt % (preferably, 0.1 to 7.5 wt %; more preferably, 0.2 to 5 wt %; most preferably, 0.5 to 2.5 wt %), based on the weight of the aqueous liquid laundry formulation, of a hydrotrope. More preferably, the aqueous liquid laundry of the present invention, optionally further comprises: 0 to 10 wt % (preferably, 0.1 to 7.5 wt %; more preferably, 0.2 to 5 wt %; most preferably, 0.5 to 2.5 wt %), based on the weight of the aqueous liquid laundry formulation, of a hydrotrope; wherein the hydrotrope is selected from the group consisting of alkyl hydroxides; glycols; urea; monoethanolamine; diethanolamine; triethanolamine; calcium, sodium, potassium, ammonium and alkanol ammonium salts of xylene sulfonic acid, toluene sulfonic acid, ethylbenzene sulfonic acid, naphthalene sulfonic acid and cumene sulfonic acid; salts thereof and mixtures thereof. Most preferably, the aqueous liquid laundry formulation of the present invention, further comprises: 0 to 10 wt % (preferably, 0.1 to 7.5 wt %;

more preferably, 0.2 to 5 wt %; most preferably, 0.5 to 2.5 wt %), based on the weight of the aqueous liquid laundry formulation, of a hydrotrope; wherein the hydrotrope is selected from the group consisting of sodium toluene sulfonate, potassium toluene sulfonate, sodium xylene sulfonate, ammonium xylene sulfonate, potassium xylene sulfonate, calcium xylene sulfonate, sodium cumene sulfonate, ammonium cumene sulfonate and mixtures thereof.

Preferably, the aqueous liquid laundry formulation of the present invention, optionally further comprises a builder. More preferably, the aqueous liquid laundry formulation of the present invention, optionally further comprises: 0 to 50 wt % (preferably, 5 to 50 wt %; more preferably, 7.5 to 30 wt %), based on the weight of the aqueous liquid laundry formulation, of a builder. Most preferably, the aqueous liquid laundry formulation of the present invention, optionally further comprises: 0 to 50 wt % (preferably, 5 to 50 wt %; more preferably, 7.5 to 30 wt %), based on the weight of the aqueous liquid laundry formulation, of a builder; wherein the builder is selected from the group consisting of inorganic builders (e.g., tripolyphosphate, pyrophosphate); alkali metal carbonates; borates; bicarbonates; hydroxides; zeolites; citrates (e.g., trisodium citrate, dihydrate); polycarboxylates; monocarboxylates; aminotrismethylenephosphonic acid; salts of aminotrismethylenephosphonic acid; hydroxyethanediphosphonic acid; salts of hydroxyethanediphosphonic acid; diethylenetriaminepenta (methylenephosphonic acid); salts of diethylenetriaminepenta(methylenephosphonic acid); ethylenediaminetetraethylene-phosphonic acid; salts of ethylenediaminetetraethylene-phosphonic acid; oligomeric phosphonates; polymeric phosphonates; mixtures thereof.

Preferably, the aqueous liquid laundry formulation of the present invention, optionally further comprises a fabric softener. More preferably, the aqueous liquid laundry formulation of the present invention, optionally further comprises: 0 to 10 wt % (preferably, 0.5 to 10 wt %), based on the weight of the aqueous liquid laundry formulation, of a fabric softener. Most preferably, the aqueous liquid laundry formulation of the present invention, optionally further comprises: 0 to 10 wt % (preferably, 0.5 to 10 wt %), based on the weight of the aqueous liquid laundry formulation, of a fabric softener; wherein the fabric softener is a cationic coacervating polymer (e.g., cationic hydroxyl ethyl cellulose; polyquaternium polymers and combinations thereof).

Preferably, the aqueous liquid laundry formulation of the present invention, optionally further comprises a pH adjusting agent. More preferably, the aqueous liquid laundry formulation of the present invention, optionally further comprises a pH adjusting agent; wherein the aqueous liquid laundry formulation has a pH from 6 to 12.5 (preferably, 6.5 to 11; more preferably, 7.5 to 10). Bases for adjusting pH include mineral bases such as sodium hydroxide (including soda ash) and potassium hydroxide; sodium bicarbonate; sodium silicate; ammonium hydroxide; and organic bases (e.g., mono-, di- or tri-ethanolamine; and 2-dimethylamino-2-methyl-1-propanol (DMAMP)). Acids to adjust the pH include mineral acids (e.g., hydrochloric acid, phosphorus acid and sulfuric acid) and organic acids (e.g., acetic acid).

Preferably, the method for renewing a soiled cotton containing fabric of the present invention, comprises: providing a soiled cotton containing fabric; providing an aqueous liquid laundry formulation of the present invention; providing a wash water; providing a rinse water; contacting the soiled cotton containing fabric with the aqueous liquid laundry formulation and the wash water to provide a renewed cotton containing fabric; and contacting the renewed cotton containing fabric with the rinse water to rinse off the aqueous liquid laundry formulation. More preferably, the method for renewing a soiled cotton containing fabric of the present invention, comprises: providing a soiled cotton containing fabric (preferably, wherein the soiled cotton containing fabric is soiled with at least one of oil and clay soil; more preferably, wherein the soiled cotton containing fabric is soiled with sebum oils and clay soil) (preferably, wherein the soiled cotton containing fabric is selected from the group consisting of at least one of soiled cotton fabric, soiled polyester cotton blend fabric, soiled cotton terry fabric and soiled cotton interlock fabric; more preferably, wherein the soiled cotton containing fabric is at least one of soiled polyester cotton blend fabric and soiled cotton fabric); providing an aqueous liquid laundry formulation of the present invention; providing a wash water (preferably, wherein the wash water is at a temperature of 20 to 60° C.; more preferably, 30 to 50° C.; most preferably, 35 to 45° C.); providing a rinse water; contacting the soiled cotton containing fabric with the aqueous liquid laundry formulation and the wash water to provide a renewed cotton containing fabric, wherein sufficient aqueous liquid laundry formulation is provided to give a cellulase concentration of 0.005 to 1.0 ppm by mass (preferably, 0.02 to 0.5 ppm by mass) in the wash water; and contacting the renewed cotton containing fabric with the rinse water to rinse off the aqueous liquid laundry formulation.

Preferably, the method for renewing a soiled cotton containing fabric of the present invention, further comprises: aging the aqueous liquid laundry formulation at ≥40° C. (preferably, 40 to 90° C.) for at least seven weeks (preferably, 7 to 12 weeks; more preferably, 7 to 10 weeks; most preferably, 7 to 8 weeks) before contacting the soiled cotton containing fabric.

Some embodiments of the present invention will now be described in detail in the following Examples.

The monomer abbreviations used in the Examples are described in TABLE 1.

TABLE 1

| Abbreviation | Monomer |
|---|---|
| AA | Acrylic acid |
| MAA | Methacrylic acid |
| EA | Ethyl acrylate |
| DMAEMA | 2-(dimethylamino)ethyl methacrylate |

Synthesis S1: Protectant Polymer

A monomer emulsion was prepared in a plastic-coated vessel by adding 28% sodium lauryl sulfate (9.4 g) and deionized water (309.3 g) and mixed with overhead stirring. Ethyl acrylate (297.2 g) was then charged to the plastic-coated vessel followed by methacrylic acid (138.8 g). Then acrylic acid (77.11 g) was added slowly to the plastic-coated vessel contents forming a smooth, stable monomer emulsion.

An initiator solution was prepared in a separate container by adding ammonium persulfate (0.55 g) and deionized water (18.6 g).

A cofeed catalyst solution was prepared in a separate container by dissolving ammonium persulfate (0.22 g) in deionized water (47 g).

To a three liter round bottom flask, equipped with a mechanical stirrer, heating mantle, thermocouple, condenser and inlets for the addition of monomer, initiator and nitrogen was charged deionized water (609 g) followed by 28% sodium lauryl sulfate (13.73 g), followed by deionized water (15 g). The flask contents were then set to stir with a nitrogen flow and heated to 89° C. When the flask contents reached 89° C., 13.73 g of 28% sodium lauryl sulfate, followed by 15 g of deionized water were added. Then 41.6 g of the monomer emulsion from the plastic-coated vessel was charged to the flask contents followed by addition of the initiator solution. As the reaction in the flask was initiating, 1-dodecanethiol (10 g) was added to the stirring monomer emulsion in the plastic-coated vessel. The contents of the plastic-coated vessel was then added to the flask contents over 90 min at 8.89 mL/minute while maintaining temperature between 84 and 86° C. The feed to the flask contents of the cofeed catalyst solution was started simultaneously with the monomer feed from the plastic-coated vessel and continued at a constant rate over 95 minutes. A rinse through the monomer feed line of deionized water (36 g) was then added to the flask contents. At the end of the cofeed catalyst solution, the flask contents were held for 20 minutes at 85° C.

A chase solution of ammonium persulfate (0.22 g) dissolved in deionized water (62.6 g) was prepared. While cooling the flask contents to 75° C. the chase solution was added at a rate of 3.15 g/min over 20 minutes. The flask contents were then held for 15 min.

Chase activator solution was prepared by dissolving 70% tert-butyl hydroperoxide (1.25 g) in deionized water (34.6 g). A catalyst solution was prepared by dissolving isoascorbic acid (1.77 g) in deionized water (42.1 g).

A promoter solution of a 0.15% iron sulfate heptahydrate solution (2.8 g) was added to the flask contents. The chase activator solution and catalyst solution were then added to the flask contents over 45 min while cooling the flask contents to 55° C. The flask contents were then held for 5 minutes. Then deionized water (50 g) was added to the flask contents and cooling began.

A pH buffer solution of sodium benzoate (2.4 g) dissolved in deionized water (15 g) was prepared. When the flask contents cooled to <40° C., the pH buffer solution was added to the flask contents over 5 minutes. The flask contents were then further cooled to room temperature and the product emulstion polymer was filtered through a 100 mesh bag.

The product emulstion polymer had a solids content of 29.1% and a pH=3.7. By GC, the total residual monomer content was <100 ppm.

Synthesis S2: Protectant Polymer

A glacial acrylic acid (AA) feed (356.4 g) was added to a graduated cylinder.

A 2-(dimethylamino)ethyl methacrylate (DMAEMA) feed (39.6 g) was added to a syringe.

An initiator solution was prepared in a separate container by dissolving sodium persulfate (2.42 g) in deionized water (25 g).

A chain regulator solution was prepared in a separate container by dissolving 25.64 g sodium metabisulfite (25.64 g) in 64 g deionized water (64 g).

A precharge solution was prepared in a separate container by dissolving sodium metabisulfite (1.08 g) in deionized water (5 g).

A 0.15% iron sulfate heptahydrate promoter solution (3.32 g) was prepared in a separate container.

To a two liter round bottom flask, equipped with a mechanical stirrer, heating mantle, thermocouple, condenser and inlets for the addition of monomer, initiator and chain regulator was charged deionized water (346 g). The flask contents were set to stir and heated to 72° C.

Once the flask contents reached 72° C., the promoter solution was added, followed by a deionized water rinse (1.4 g), followed by the precharge solution. The following feeds to the flask contents were started simultaneously:

Chain regulator solution—1.18 g/min for 75 min;

Glacial acrylic acid (AA) feed—3.95 g/min for 90 min;

2-(dimethylamino)ethyl methacrylate (DMAEMA) feed—0.44 g/min for 90 min;

and

Initiator solution—0.28 g/min for 95 min.

At the completion of these feeds, deionized water (6 g) was added the flask contents through the glacial acrylic acid (AA) feed line and deionized water (6 g) was added to the flask contents through the DMAEMA syringe. The flask contents were then held for 10 minutes at 72° C.

A first chase solution was prepared using sodium persulfate (0.99 g) and deionized water (10 g). A second chase solution was prepared using sodium persulfate (1.08 g) and deionized water (10 g).

At the completion of the 10 minute hold, the first chase solution was added linearly to the flask contents over 10 min. The flask contents were then held for 20 minutes at 72° C. The second chase solution was then added to the flask contents over 10 minutes. The flask contents were then held for 20 min at 72° C.

At the completion of the final hold, deionized water (51 g) was added to the flask contents with cooling. Once the flask contents reached <50° C., monoethanolamine (203 g) was added to an addition funnel and slowly added to the flask contents over 30 min, controlling the exotherm such that the flask contents remained below 70° C. The funnel was then rinsed into the flask contents with deionized water (8 g). A 35% hydrogen peroxide solution (1 g) was added to the flask contents. Then deionized water (60 g) was added to the flask contents. After cooling the product emulsion polymer was recovered.

The final polymer had a solids content of 53.7% (as measured in a forced draft oven at 150° C. for 60 min). The pH of the solution was 6.11 and final molecular weight as measured by Gel Permeation Chromatography was 6,848 Da.

Comparative Examples C1-C5 and Example 1: Aqueous Liquid Laundry Formulation The aqueous liquid laundry formulations used in the anti-redeposition tests in the subsequent Examples had the formulation described in TABLE 2 prepared by standard liquid laundry formulation preparation procedures and using the protectant polymers from Syntheses S1-S2 having the monomer feed compositions noted in TABLE 3.

TABLE 2

| | Example (in wt %) | | | | | |
|---|---|---|---|---|---|---|
| Ingredient | C1 | C2 | C3 | C4 | C5 | 1 |
| Linear alkyl benzene sulfonate[1] | 14.24 | 14.24 | 14.24 | 14.24 | 14.24 | 14.24 |
| Alcohol ethoxylate propoxylate[2] | 8.25 | 8.25 | 8.25 | 8.25 | 8.25 | 8.25 |

TABLE 2-continued

| | Example (in wt %) | | | | | |
|---|---|---|---|---|---|---|
| Ingredient | C1 | C2 | C3 | C4 | C5 | 1 |
| Propylene glycol | 5.0 | 5.0 | 5.0 | 5.0 | 5.0 | 5.0 |
| Trisodium citrate, dihydrate | 2.0 | 2.0 | 2.0 | 2.0 | 2.0 | 2.0 |
| Fatty acid[3] | 6.4 | 6.4 | 6.4 | 6.4 | 6.4 | 6.4 |
| Ethanol | 2.0 | 2.0 | 2.0 | 2.0 | 2.0 | 2.0 |
| Sodium xylenesulfonate | 5.7 | 5.7 | 5.7 | 5.7 | 5.7 | 5.7 |
| Product of Synthesis S1 | 0 | 0 | 0.5 | 0 | 0 | 1.5 |
| Product of Synthesis S2 | 0 | 0 | 0 | 0.5 | 0.5 | 0 |
| Cellulase[4] | 0 | 0.12 | 0 | 0 | 0.12 | 0.12 |
| Deionized water | q.s. 100 | | | | | |
| Monoethanolamine (MEA)[5] | up to pH 8.5 | | | | | |

[1]available from Stepan Company under tradename Nacconal 90 G
[2]available from The Dow Chemical Company under tradename EcoSurf SA-7
[3]available from Croda under tradename Prifac 7908
[4]available from Novozymes under tradename Celluclean 5000 L
[5]available from The Dow Chemical Company

TABLE 3

| | Monomer Feed composition (wt %) | | | |
|---|---|---|---|---|
| Example | AA | MAA | EA | DMAEMA |
| Synthesis S1 | 15 | 27 | 58 | — |
| Synthesis S2 | 90 | — | — | 10 |

Anti-Redeposition

The anti-redeposition performance of the aqueous liquid laundry formulations of Comparative Examples C1-C5 and Example 1 were assessed after preparation (Time TO) and after aging for seven weeks in a sealed container at 40° C. (Time T7-40° C.) following A.I.S.E. recommended methodology. Washing machines (Novotronic W 1614 from Miele) were used with the conditions noted in TABLE 4.

TABLE 4

| Parameter | Setting |
|---|---|
| Temperature | 40° C., cotton program, 1000 rpm |
| Water hardness | 30° TH |
| Fabric Types | Cotton (C)<br>Polyester: cotton blend (PB) |
| Ballast | 3.5 kg ballast per load (from WFK Testfewebe GmbH) consisting of 1 bed sheet (reference T11), 5 huckabacks (reference T12) and 6 pillowcases (reference T13) |
| White Set | Reference white fabric used for antiredeposition measurement/per machine:<br>2 standard WFK cotton swatches (reference 10A)<br>2 polyester cotton (65/35 PeCo) swatches (reference 20A) |
| Greying swatches | 2 greying swatches coded W-Grayingl from Center for Testmaterials BV per machine and per cycle |
| Aqueous liquid laundry formulation dosage | 60 g per machine per cycle |
| Cycles | 6 cycles per test |

The fabrics were laundered for 6 consecutive cycles and the reflectance Y (D65) of each white swatch (Cotton, CO; and Polyester:cotton blend, PB) was measured with a spectrophoto colorimeter (Konica Minolta CM2600d). Each white swatch was folded in the same manner and the Y value was measured at two points on each side of the fabric with the average value reported in TABLE 5.

TABLE 5

| | Average Y (D65) | | | |
|---|---|---|---|---|
| | Cotton (CO) | | Polyester/cotton blend (PB) | |
| Example | T0 | T7-40° C. | T0 | T7-40° C. |
| Comparative Example C1 | 63,374 | 62,513 | 72,365 | 69,176 |
| Comparative Example C2 | 80,898 | 61,729 | 80,472 | 69,420 |
| Comparative Example C3 | 62,769 | 63,230 | 71,977 | 68,851 |
| Comparative Example C4 | 65,545 | 60,511 | 73,124 | 68,994 |
| Comparative Example C5 | 79,405 | 62,736 | 80,487 | 71,102 |
| Example 1 | 79,994 | 67,185 | 80,573 | 71,527 |

We claim:

1. A method for renewing a soiled cotton containing fabric comprising:

providing a soiled cotton containing fabric;

providing an aqueous liquid laundry formulation, comprising:

a liquid carrier;

a cellulase; and a protectant polymer, wherein the protectant polymer comprises:

25 to 65 wt %, based on weight of the protectant polymer, of structural units of formula I

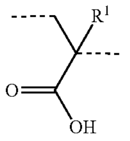

I wherein each $R^1$ is independently selected from a hydrogen and a $—CH_3$ group; and 35 to 75 wt %, based on weight of the protectant polymer, of structural units of formula II

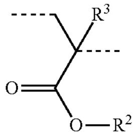

II wherein each $R^2$ is independently selected from a $—C_{2-3}$ alkyl group and wherein each $R^3$ is independently selected from a hydrogen and a methyl group;

aging the aqueous liquid laundry formulation at greater than or equal to 40° C. for at least seven weeks before contacting the soiled cotton containing fabric;

providing a wash water;

providing a rinse water;

contacting the soiled cotton containing fabric with the aged aqueous liquid laundry formulation and the wash water to provide a renewed cotton containing fabric; and contacting the renewed cotton containing fabric with the rinse water to rinse off the aqueous liquid laundry formulation.

2. The method of claim 1, wherein the aqueous liquid laundry formulation further comprises an additional component selected from the group consisting of: a cleaning surfactant; organic solvent; a structurant; a hydrotrope; a fragrance; an ethanol amine; a foam control agent; a builder and a fabric softener.

3. The method of claim 2, wherein the aqueous liquid laundry formulation includes a cleaning surfactant selected from the group consisting of an anionic surfactant, a nonionic surfactant, a cationic surfactant, an amphoteric surfactant and mixtures thereof.

4. The method of claim 3, wherein the aqueous liquid laundry formulation includes an anionic surfactant.

5. The method of claim 4, wherein the anionic surfactant is selected from the group consisting of a $C_{12-16}$ alkyl benzene sulfonic acid, a $C_{12-16}$ alkyl benzene sulfonate, a $C_{12-18}$ paraffin-sulfonic acid, a $C_{12-18}$ paraffin-sulfonate, a $C_{12-16}$ alkyl polyethoxy sulfate and mixtures thereof.

6. The method of claim 5, wherein the aqueous liquid laundry formulation includes a hydrotope.

7. The method of claim 6, wherein the aqueous liquid laundry formulation includes a builder.

8. The method of claim 7, wherein the aqueous liquid laundry formulation includes at least one of an organic solvent and a foam control agent.

* * * * *